(12) United States Patent
Honegger

(10) Patent No.: US 6,742,648 B2
(45) Date of Patent: Jun. 1, 2004

(54) RAIL GUIDABLE CONVEYING DEVICE AND APPARATUS FOR CONVEYING PRINTED PRODUCTS

(75) Inventor: Werner Honegger, Bach (CH)

(73) Assignee: Ferag AG, Hinwil (CH)

( * ) Notice: Subject to any disclaimer, the term of this patent is extended or adjusted under 35 U.S.C. 154(b) by 219 days.

(21) Appl. No.: 10/024,302

(22) Filed: Dec. 17, 2001

(65) Prior Publication Data

US 2002/0073874 A1 Jun. 20, 2002

(30) Foreign Application Priority Data

Dec. 18, 2000 (CH) ............................................. 2463/00

(51) Int. Cl.⁷ ............................................. B65G 29/00
(52) U.S. Cl. ............................. 198/687.1; 198/867.13; 271/204
(58) Field of Search ........................ 271/204; 198/418.7, 198/678.1, 679, 463.1, 687.1, 867.13, 690.1, 345.3

(56) References Cited

U.S. PATENT DOCUMENTS

| 3,782,529 A | * | 1/1974 | Buccicone | ................. 198/679 |
| 3,807,314 A | | 4/1974 | Slemmons | |
| 4,051,946 A | * | 10/1977 | Buccicone | ............... 198/690.1 |
| 4,114,539 A | | 9/1978 | Deno | |
| 4,718,349 A | | 1/1988 | Wahrén | |
| 6,357,574 B1 | * | 3/2002 | Eberle et al. | ............. 198/465.4 |
| 6,386,356 B1 | * | 5/2002 | Eberle | ................... 198/867.01 |
| 6,394,449 B1 | * | 5/2002 | Reist | ........................... 271/204 |
| 6,398,016 B1 | * | 6/2002 | Maeder et al. | ......... 198/867.13 |

FOREIGN PATENT DOCUMENTS

| DE | 195 38 350 A1 | 7/1997 |
| GB | 966402 | 8/1964 |
| WO | WO 99/33730 A1 | 7/1999 |
| WO | WO 99/33731 A1 | 7/1999 |

* cited by examiner

Primary Examiner—Donald P. Walsh
Assistant Examiner—Kaitlin Joerger
(74) Attorney, Agent, or Firm—Alston & Bird LLP

(57) ABSTRACT

A rail guidable conveying device for conveying sheet-like products (21) in a conveying direction (F), having a guide part (2), a carrying part (3) which is arranged on the guide part and is configured for retaining a product, and a coupling part (4), which can be magnetically coupled to a drive means (5) and is configured such that the strength of the coupling to the drive means is variable. The invention also relates to a conveying apparatus having a drive means and a plurality of the conveying devices.

23 Claims, 4 Drawing Sheets

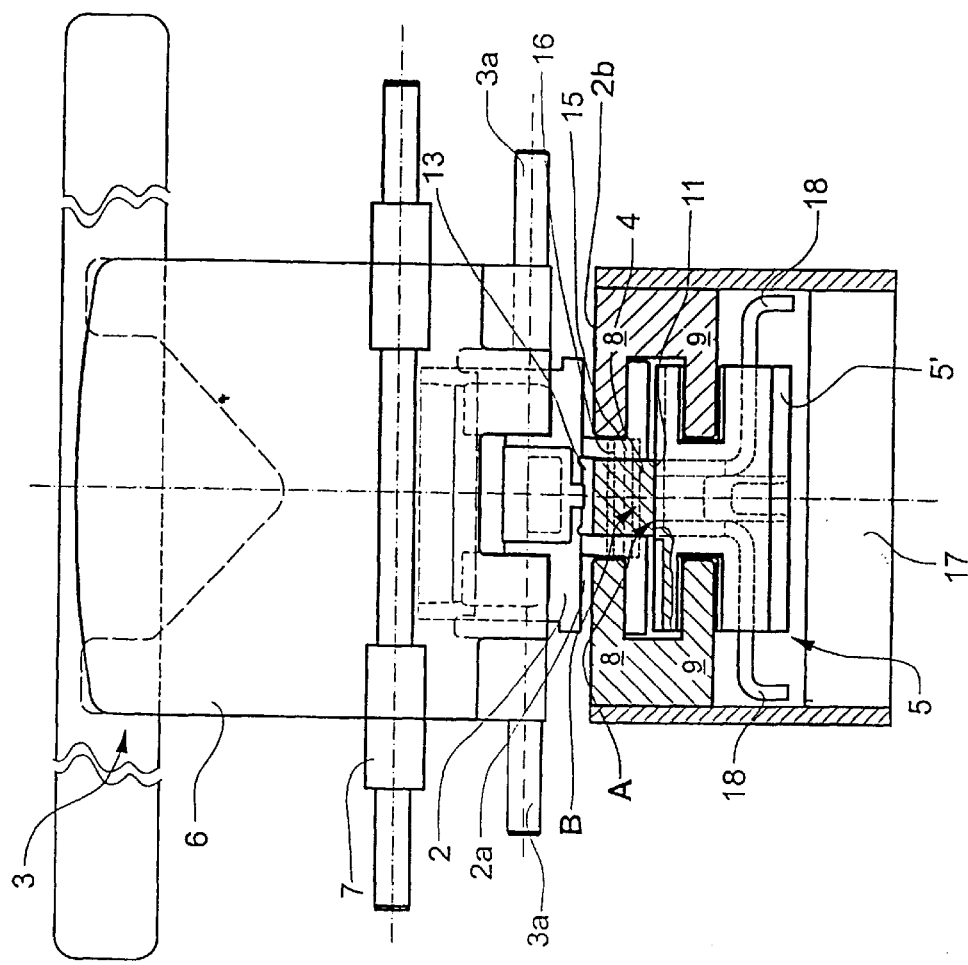
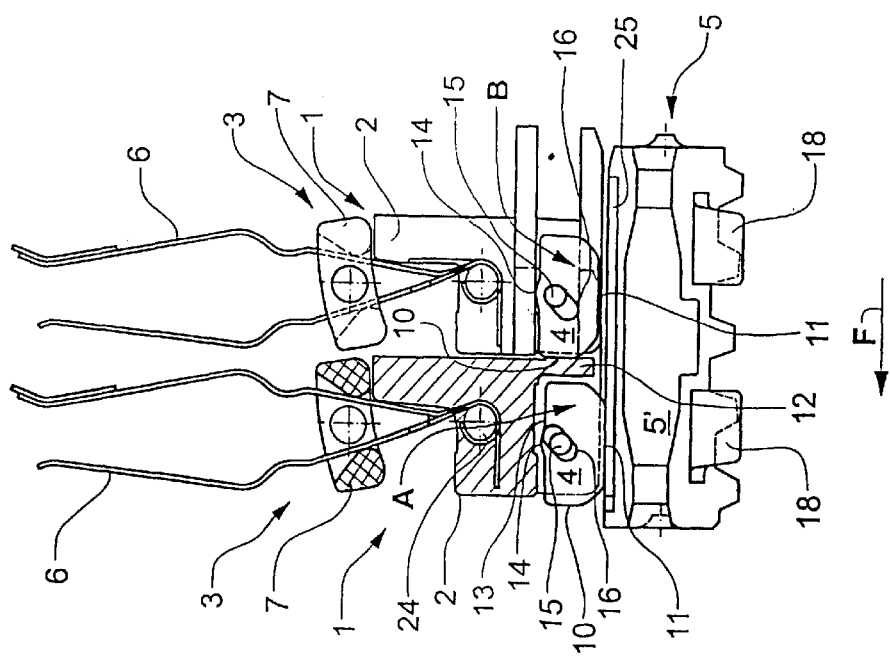

RAIL GUIDABLE CONVEYING DEVICE AND APPARATUS FOR CONVEYING PRINTED PRODUCTS

BACKGROUND OF THE INVENTION

The invention relates to a rail guidable conveying device and apparatus for conveying printed products, of the type disclosed in CH 382768 and GB 966,402. In such prior apparatus, a plurality of conveying devices fixed to a rail grip the printed products, convey them along the rail and deposit them at a remote location.

WO 99/33730 discloses a conveying system which can be used in the manner described in WO 99/33731, and which comprises a guide part, which is of V-shaped design in the conveying direction, a carrying part, which is fixed to the guide part and is intended for retaining a product, and a coupling part, which is configured such that it can be coupled to a drive means. Examples of drive means used are continuously driven bodies or elements which are moved in the conveying direction and transmit a magnetic force to the conveying devices, or the coupling parts thereof, from stationary magnets arranged along the movement path. In the case of the known conveying means, the coupling part is fixed to the guide part. The strength of the coupling is thus determined predominantly by the strength and arrangement of the magnets. At locations at which a pronounced forward movement of the conveying device is desired, magnets are arranged relatively closely together and/or relatively strong magnets are provided, while fewer magnets, or no magnets at all, are provided at other locations, e.g. in the region of a buffer storage section.

The above described prior conveying devices are problematic when different conveying speeds are to be realized at the same location of the movement path, in particular when conveying devices are to be stopped temporarily and then conveyed further individually or as a group at the original speed. It is indeed known to block the continuing movement of the conveying devices mechanically by restraining elements in order to realize a buffer storage section. However, on account of the coupling remaining unchanged, mechanical wear is produced by the carrying-along effect of the drive means, as a result of which the coupling and the state of the restraining element may be impaired in the long term. In order to reduce the wear-inducing force, it is known to arrange fewer magnets in the region of a buffer storage section. This has the disadvantage, however, that the operation of conveying the conveying devices further as the restraining element is removed likewise takes place only with reduced force and thus at a slower speed.

The object of the invention is thus to provide a conveying device and a conveying apparatus in which the abovementioned disadvantages are avoided and it is possible to park or buffer-store the conveying devices with the lowest possible level of wear and to convey them further without being slowed down significantly.

SUMMARY OF THE INVENTION

The above and other objects and advantages of the invention are achieved by the provision of a rail guidable conveying device for conveying sheet like products, and which comprises a guide part, a carrying part which is arranged on the guide part, and a coupling part which can be coupled to a drive means. The coupling part is configured such that the strength of the coupling to the drive means is variable. It is thus possible to change the advancing force by adjustment of the conveying device, preferably by mechanical action by means of obstructions which are located in the movement path and may be, for example, restraining elements or other conveying devices which have already been stopped. The mechanical components involved are therefore exposed to less wear. Furthermore, the coupling can be reproduced at full strength without any significant time delay.

In the case of a conveying apparatus according to the invention, use is likewise made of conveying devices having a coupling part which allows the coupling strength to be varied. The conveying apparatus preferably has at least one switchable restraining element which is arranged in the region of the movement path of the conveying devices. The restraining element can stop the conveying devices by acting on the coupling part, on the guide part or on the carrying part. The coupling part here is preferably designed such that the restraining element acting thereon causes the coupling strength to be reduced, e.g. by it moving the coupling part away from the drive means.

The invention achieves higher flexibility in the case of conveying apparatus, in particular in respect of the individual movement and stoppage of conveying devices, since the change in the advancing force, rather than having to be carried out on the conveying apparatus itself, takes place on the conveying devices. The invention advantageously makes it possible, using the same conveying apparatus, for the conveying devices both to be transported with a high conveying force and to be buffer stored at any desired locations of the movement path with a low level of wear and a low restraining force. The coupling to the drive means can be reproduced, according to the invention, largely without any time delay, with the result that individual conveying devices can rapidly be transported further following the stoppage. For this purpose, it is advantageous if, rather than the coupling being reduced to zero during the stoppage, a residual conveying force acts even in the buffer stored state. Furthermore, it is then also possible for a number of conveying devices which have been moved up against one another in a buffer storage section to be conveyed further as a block.

In order to change the coupling mechanically, the coupling part can be moved relative to the guide part between at least a first and a second position, the coupling being weaker in the second position than in the first position. For this purpose, the coupling part is connected, for example, pivotably to the guide part or is suspended in a floating manner on the guide part. With force being applied to a first surface, which is preferably oriented in the conveying direction, a second surface, which is directed toward the drive means, is moved. This varies the spacing in relation to the drive means and thus the coupling.

Each conveying device preferably may be coupled magnetically to the drive means, the coupling part in this case at least partially consisting of ferromagnetic material. By virtue of the spacing between the coupling part and the drive means being changed, it is easily possible to change the strength of the coupling.

In a preferred configuration of the conveying apparatus, the conveying devices are driven via magnetic force, with magnets being arranged in a stationary manner in the region of the movement path and driving taking place by moving the drive means which transmits the magnetic force to the conveying devices. The magnetic coupling may be increased, in principle, by a suitable configuration of flux parts, which are connected to the drive means. This has the advantage that, in principle, a high conveying force can be realized with the same magnet strength, it being the case that, in the regions in which a lower conveying force is desired, e.g. in buffer storage sections, the coupling is reduced by action according to the invention on the conveying devices or coupling part thereof.

BRIEF DESCRIPTION OF THE DRAWINGS

Exemplary embodiments of the invention are described hereinbelow and are illustrated in the drawing, in which, purely schematically:

FIG. 1 shows two conveying devices according to the invention in a conveying apparatus system in a longitudinal section view extending in the conveying direction;

FIG. 2 shows the arrangement from FIG. 1 in a section view in a plane normal to the conveying direction;

DETAILED DESCRIPTION OF THE PREFERRED EMBODIMENT

Figure 3:
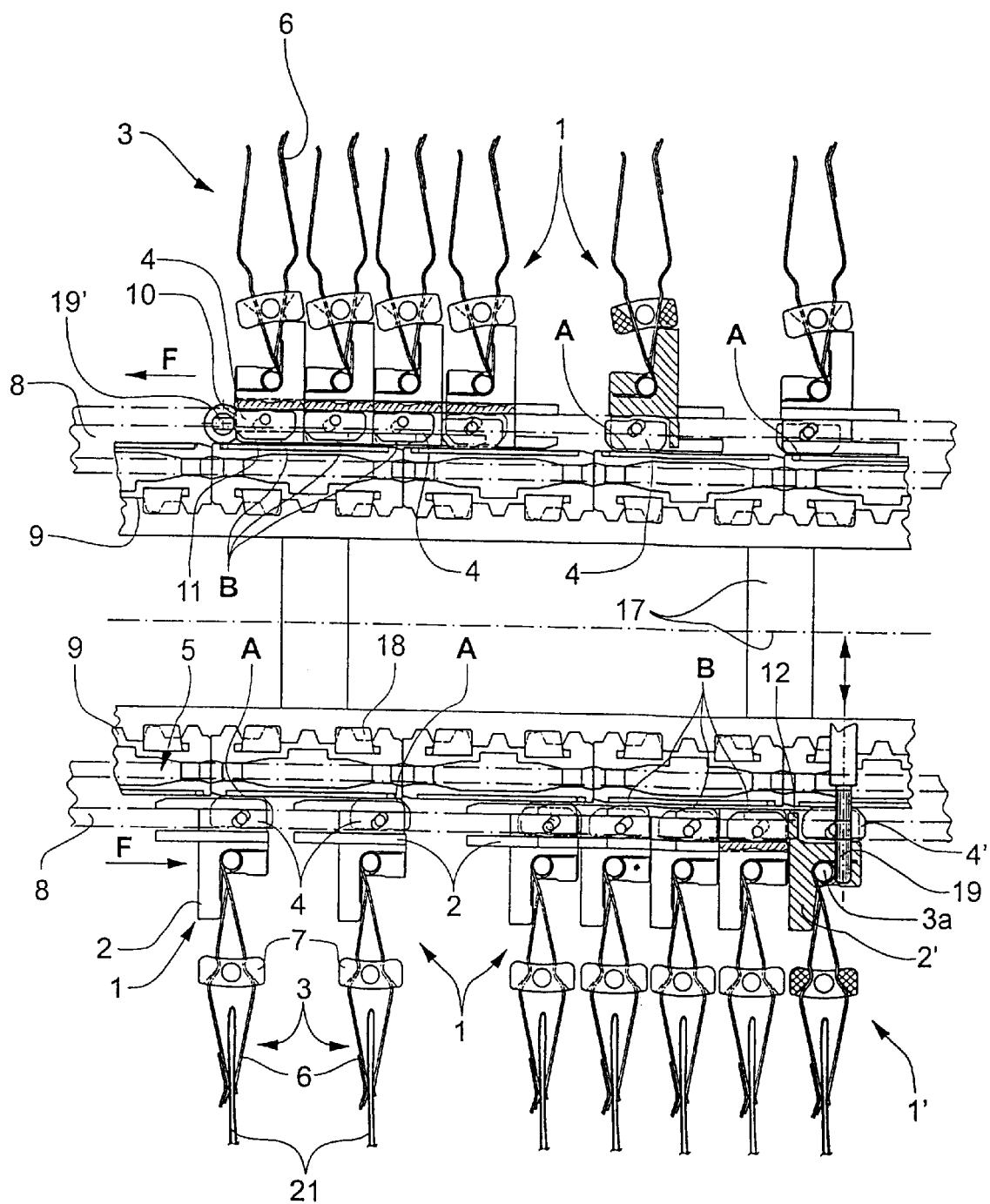
FIG. 3 shows a conveying apparatus according to the invention in a section view extending in the conveying direction.

FIG. 1 shows conveying devices 1 in a conveying apparatus according to the invention in a section view which extends in the conveying direction F. FIG. 2 shows the same arrangement in a section view in a plane normal to the conveying direction F. The construction and functioning of the conveying devices 1 and of the conveying apparatus are generally described in WO 99/33730, WO 99/33731 and WO 99/33732, the disclosures of which are incorporated by reference. The conveying devices 1 and the conveying apparatus are thus only described hereinbelow to the extent which is necessary for understanding the present invention.

FIG. 1 illustrates two conveying devices 1 which can move in the conveying direction F along a first guide rail 8. They are driven by a drive means 5, in this case a line which comprises individual members 5' and which is moved in the conveying direction F by a mechanical drive. The members 5' slide along a second guide rail 9, which runs preferably parallel to the first guide rail 8.

The drive means 5 transmits a magnetic force to coupling parts 4 of the conveying devices 1 by way of magnets 17 arranged in the stationary manner along the second rail 9. For this purpose, each member 5' of the drive means 5 has flux parts 18. In the present example, there are two flux parts which are located opposite one another symmetrically to the longitudinal plane of the conveying apparatus and are each oriented perpendicularly to the magnet 17 and to the coupling part 4, the surface area enclosed therebetween decreasing in the direction of the coupling part. In this way, the magnetic field lines are concentrated, and a high field, and thus high coupling of the conveying means, is achieved.

Each conveying device 1 comprises a guide part 2, a carrying part 3 and a coupling part 4. The guide part 2 slides in the first guide rail 8. For this purpose, it has, for example, in each case two guides 2a, 2b which are arranged laterally in the conveying direction F and interact with the first guide rail 8. In the present example, the guide part 2 is of H-shaped configuration in a plane normal to the conveying direction F, as is shown in FIG. 2. In order for it to be possible for products to be conveyed as closely together as possible, but nevertheless in a stable position, the guide part 2 is preferably of V-shaped configuration in the conveying direction (not illustrated here). The carrying part is preferably fastened on the guide part such that it can be pivoted about a spindle 24 running perpendicularly to the conveying direction F. The carrying part 3 comprises a clamp 6 which can be opened or closed by a slide 7. The slide can be moved, for example, via a guide.

According to the invention, the coupling part 4, rather than being fixed to the guide part 2, can be moved between a first position A, as is shown for the front conveying device as seen in the conveying direction F, and a second position B as is shown for the rear conveying device as seen in the conveying direction F. In the position A, the coupling part 4 is in contact with the sliding surface 25 of the drive means 5, said sliding surface consisting of a reduced-friction material. In position A, the coupling of the conveying device 1 to the drive means 5 is thus at its strongest. In position B, the coupling part 4 is spaced apart from the sliding surface 25, and the coupling is thus reduced.

According to the invention, the coupling part 4 can be moved between the positions A and B. The capacity for movement is realized by suitable mounting of the coupling part 4 within the guide part 2. In the present example, with the first, front surface 10, as seen in the conveying direction F, subjected to pressure, the coupling part 4 is moved counter to the conveying direction F within the guide part 2. At the same time, its second surface 11, which is directed toward the drive means, is forced away from the sliding surface 25. For this purpose, the coupling part 4 is of essentially cuboidal configuration and is mounted in a likewise essentially cuboidal cut-out 13 within the guide part 2 such that it is largely immovable laterally, but has a small amount of play in the conveying direction F and in the direction toward the drive means. The cut-out 13 is open both toward the drive means and in the conveying direction F. As a result, on the one hand, it is possible to produce the contact with the sliding surface 25. On the other hand, the coupling part can be subjected to mechanical action from the outside in order to be forced away from the sliding surface 25. The coupling part 4 can be moved in the manner described, by means of two laterally arranged pins 15, in an elongate guide groove 16 in the guide part, said groove being oriented obliquely in relation to the conveying direction.

The dimensions of the coupling part 4 are selected such that, in the position A of the coupling part, the first surface 10 forms the foremost region of the conveying device 1, as seen in the conveying direction F. The coupling part 4 is thus moved into the second position B when the conveying device 1 moves up against an obstruction, for example a restraining element or another conveying device which has already stopped or is moving at lower speed. In FIG. 1, the rear conveying device, as seen in the conveying direction F, has moved up against the front conveying device, with the result that its coupling part 4 has been moved into the second position B by the rear side of the front conveying means, said rear side acting as a stop 12.

On the side which is directed away from the drive means 5, the coupling part 4 has a protrusion 14 which is aligned transversely to the conveying direction F. The coupling part 4 butts against the inner surface of the cut-out 13 by way of said protrusion such that, in the second position B, it can be moved relative to the guide part 2 about an axis aligned transversely to the conveying direction F. The protrusion 14 achieves the situation where, rather than tilting in the cut-out 13, the coupling part 4 returns into the first position A again, on account of the magnetic attraction, as a pressure to which the front surface 10 is subjected is reduced.

FIG. 2 shows the H-shaped cross section of the guide parts 2 and of the drive members 5'.

FIG. 1 shows conveying in the upright state. FIG. 3 shows both variants. During conveying in the upright state, the pressure to which the front surface 10 of the coupling part is subjected overcomes both the gravitational force and the magnetic force and conveys the coupling part into the second position B. During conveying in the hanging state, assisted by the gravitational force, only the magnetic attraction has to be overcome.

Figure 4:
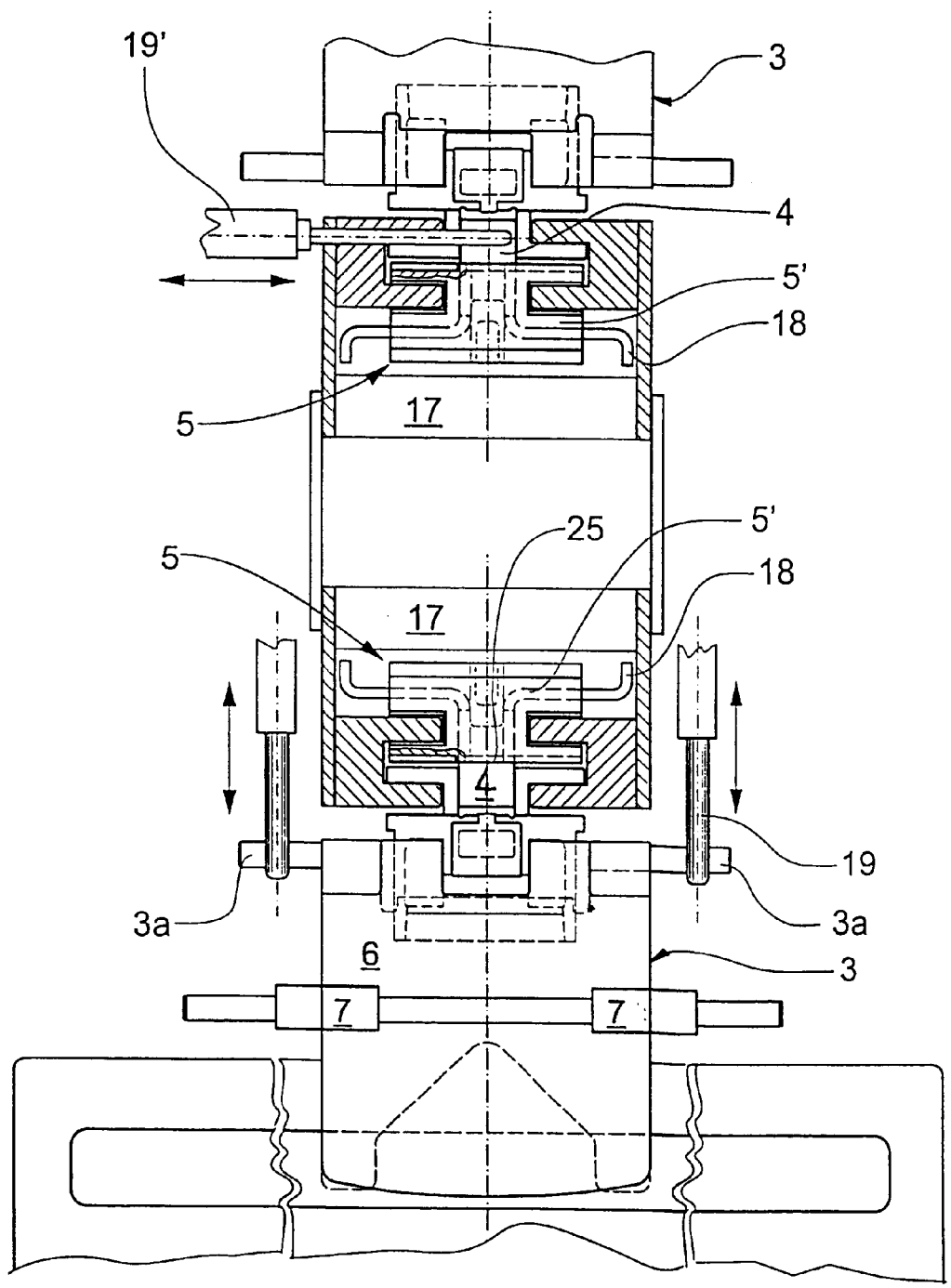
FIG. 4 shows the apparatus from FIG. 3 in a section view perpendicular to the conveying direction.

FIGS. 3 and 4 show an example of the invention being used for forming a buffer storage section in the case of both conveying in the hanging state and conveying in the upright state within the same conveying apparatus. FIG. 3 shows a side view of this, and FIG. 4 shows a view in a plane normal to the conveying direction F.

As has already been described, a plurality of conveying devices 1 slide in the first guide rail 8 and are moved in the conveying direction F by a circulating drive means 5. The conveying apparatus here comprises a bottom region, in which products 21 are conveyed in the hanging state, and a top region, in which empty conveying devices 1 are transported in the upright state, i.e. with clamp 6 oriented in the upward direction. Stationary magnets 17 are located in the region between the bottom and the top guide rails 8, 9. A restraining element 19 in the bottom region of the conveying system retains a first conveying means 1' in the region of its carrying part 3 or of lateral continuations 3a thereof. The coupling part 4' of the first conveying device 1' is not in contact, with the result that it is located in the first position A, with maximum coupling to the drive means 5. Further conveying devices 1 have run up against the first conveying device 1'. Their coupling parts 4 are each in contact with the rear side 12 of the preceding conveying device and have thus been forced into the second position B, with reduced coupling to the drive means 5. Further incoming conveying devices, which are spaced apart from one another and from the conveying devices which have already been stopped, are coupled to the drive means 5 to the maximum extent by way of their coupling parts 4, which are located in the first position A. On account of the reduced coupling, the conveying devices which have already been buffer stored are subjected to less conveying force, as a result of which there is a reduction in the wear of the coupling parts 4 and of the restraining elements 19 used for stoppage purposes. The restraining element only needs to apply a reduced restraining force.

By the first conveying devices 1' being located in the first position A, the full conveying force acts directly as the restraining element 19 is released, with the result that, upon release, the first conveying means is accelerated to the maximum extent and rapidly reaches the full transporting speed. The further buffer stored conveying devices 1 then move until the foremost conveying devices strikes against the restraining element 19.

A further buffer storage section is shown in the top part of the conveying system, in which all the conveying devices 1 are located in the state B, with minimal coupling. For this purpose, a restraining element 19' is moved into the conveying path such that its front tip comes into contact with the front surface 10 of a coupling part 4 and moves the coupling part 4 into the position B by the counterpressure. This makes it possible to design a buffer storage section in which the coupling of the conveying device located therein is reduced and the wear to which the components involved are subjected is low. The buffer stored conveying devices 1 may be released individually by the restraining element 19' being moved out of the movement path. The coupling part 4 of the foremost conveying device 1 is then moved into the first position A again by the magnetic action, with the result that the conveying device is then conveyed with the full conveying force.

FIG. 4 shows the arrangement from FIG. 3 in a plane normal to the conveying direction. The restraining element 19, which acts on the carrying part 3 or on the lateral continuations 3a thereof, is displaced upward or downward, or pivoted about an axis running perpendicularly to the conveying direction, in order to release or stop a conveying device. The restraining element 19', which acts on the coupling part 4, is displaced linearly in the lateral direction, or pivoted into and out of the movement path, in order to stop or release a conveying device.

Figure 5:
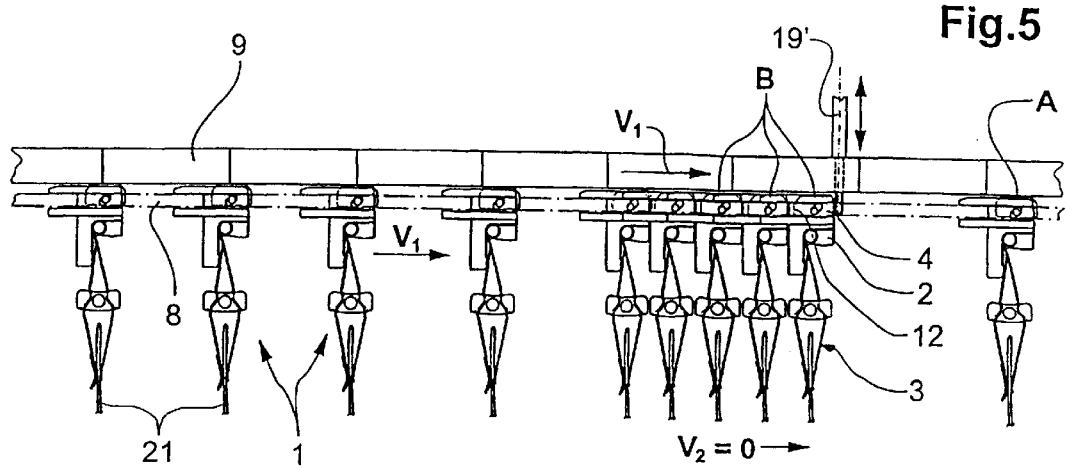
FIGS. 5–7 show different possible ways of bufferstoring the conveying devices and of retrieving the latter from the buffer storage section.
Figure 6:
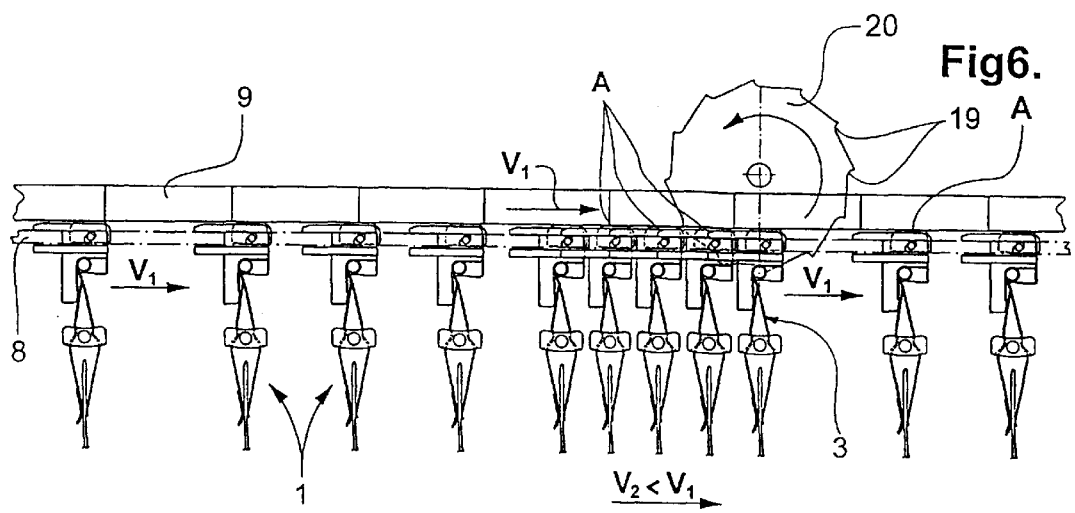
Figure 7:
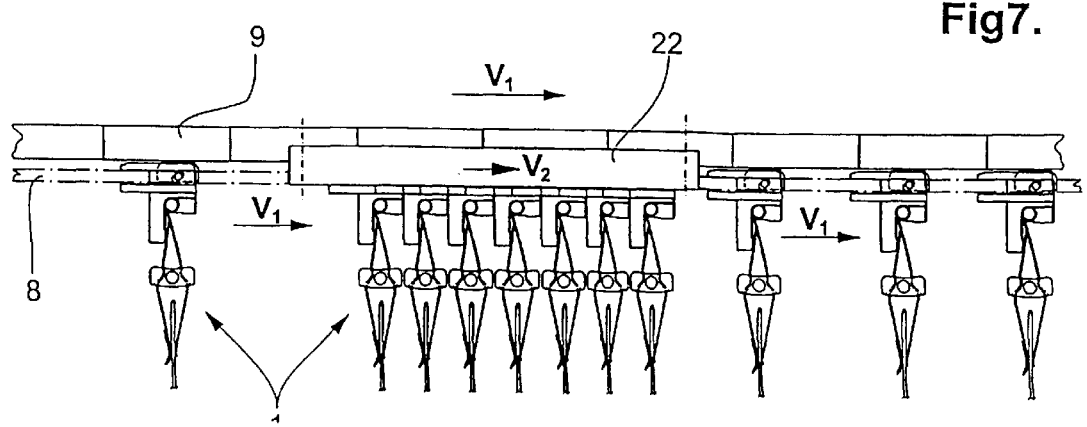

FIGS. 5 to 7 show further examples of the construction of buffer storage sections and of the retrieval of individual conveying devices 1 from such a buffer storage section.

FIG. 5 shows a buffer storage section in which the conveying devices 1 are braked from an original conveying speed V1 to a conveying speed V2, which in this case is zero, by a restraining element 19', which acts on the coupling part 4 of the conveying devices, and/or by running up against the rear side of the preceding conveying device, with the rear side acting as a stop 12. This arrangement has already been shown in the top part of FIG. 3, for the case of upright conveying means, and explained in the corresponding figure-related description.

FIG. 6 shows a further example of a buffer storage section, in which the conveying devices 1, originally moving at speed V1, rather than being fully braked, are only brought to a speed V2, which is lower than V1. A row of restraining elements 19 are fitted here on a rotating wheel 20. As described in conjunction with the bottom part of FIG. 3, the stops act briefly on the carrying part 3 or continuation 3a of the conveying devices and release the conveying devices as rotation continues. As has already been described, the coupling to the drive means 5 is fully maintained in this case, with the result that the conveying devices retained by the restraining element 19 in each case is exposed to the full conveying action following its release. A number of conveying devices accumulate in front of the wheel, however, an overall reduced conveying speed V2 being achieved by the continuous feeding and continuous release of conveying devices within the accumulated block. In the present case, the speed of revolution of the wheel 20 is adapted to the conveying speed V1 and the spacing between the individual incoming conveying devices such that the conveying means do not run up against one another within the accumulation zone and the coupling to the drive means is thus fully maintained. Corresponding adaptation of the speed of revolution, however, also makes it possible to achieve the situation where the coupling parts are located in the position B, i.e. reduced coupling, in the accumulation zone.

FIG. 7 shows a further example of such a buffer storage zone. Individual conveying devices 1 run at speed V1 into a lock-arrangement drive 22, in which they are moved at speed V2. The spacing between the conveying devices is reduced or increased in accordance with the ratio of V1 to V2. The conveying devices leave the lock-arrangement drive 22 continuously and reach the first conveying speed V1 again, although they are conveyed with a different spacing D, which depends on the speed V1, V2 and on the original conveying spacing D0.

What is claimed is:

1. A rail guidable conveying device for conveying products in a conveying direction, comprising
a guide part,
a carrying part mounted on the guide part and configured for retaining a product, and
a coupling part for coupling the device to a drive means, with the coupling part being mounted to the guide part for relative movement between a first position and a second position wherein the coupling is weaker than it is in the first position, with said coupling part having a first surface which when in use is located at the front, as seen the conveying direction, and a second surface which when in use is directed toward the drive means, and wherein when the first surface is subjected to a force essentially counter to the conveying direction the coupling part is moved from the first position toward the second position and the second surface is moved away from the drive means.

2. The conveying device as claimed in claim 1, wherein the coupling part is connected pivotably to the guide part or is suspended in a floating manner on the guide part.

3. The conveying device as claimed in claim 1, wherein the first surface partially projects beyond a front surface of the guide part, as seen in the conveying direction, at least in the first position.

4. The conveying device as claimed in claim 1, wherein the first surface is planar and is oriented generally perpendicular to the conveying direction.

5. The conveying device as claimed in claim 1, wherein the second surface is planar and is oriented generally parallel to the conveying direction.

6. The conveying device as claimed in claim 5, wherein, with force being applied to the first surface, the second surface is displaced essentially parallel to itself.

7. The conveying device as claimed in claim 6, wherein the displacement of the second surface is between about 0.5 and 5 mm.

8. The conveying device as claimed in claim 1, wherein the coupling part is of essentially cuboidal configuration and is arranged in an essentially cuboidal cut-out in the guide part, said cut-out being open in the conveying direction and toward the drive means.

9. The conveying device as claimed in claim 8, wherein, at least in the second position, the coupling part can be moved relative to the guide part about an axis aligned transversely to the conveying direction.

10. The conveying device as claimed in claim 9, wherein the coupling part includes, on its side which is directed away from the drive means, a protrusion which, in the second position, butts against an inner surface of the cut-out and allows a pivoting movement.

11. The conveying means device as claimed in claim 1 wherein the coupling part, for suspending within the guide part, has on its opposite sides which are aligned parallel to the conveying direction, pins which are capable of sliding in elongate guide grooves of the guide part, said grooves being aligned obliquely in relation to the conveying direction.

12. The conveying device as claimed in claim 1, wherein the guide part includes on its rear side as seen in the conveying direction, a stop by means of which the coupling part of a further conveying device which strikes against the stop is moved from the first position into the second position.

13. The conveying device as claimed in claim 1, wherein the coupling part is at least partially composed of a ferromagnetic material.

14. The conveying device as claimed in claim 1 wherein the guide part is in the form of a V in the conveying direction.

15. The conveying device as claimed in claim 1, wherein the guide part includes two guides which are arranged laterally in the conveying direction and in which, when in use, guide rails of a conveying apparatus engage.

16. The conveying device as claimed in claim 15, wherein the guide part is of H-shaped configuration in a plane normal to the conveying direction.

17. A conveying apparatus for conveying sheet-like printed products, comprising
a first guide rail,
a plurality of conveying devices mounted for independent movement along the first guide rail in a conveying direction, with each of said conveying devices comprising a guide part, a carrying part mounted on the guide part and configured for retaining a product, and a coupling part mounted to the guide part for relative movement between a first position and a second position and so that the coupling part is movable between the first and second positions as a result of a force acting on the coupling part in a direction essentially counter to the conveying direction,
a second guide rail,
a drive means mounted for guidance along the second guide rail and including coupling means for coupling to the coupling part of each conveying device such that in the coupled state the conveying devices can be moved by the drive means along the first guide rail, and
wherein the coupling part of each conveying device is configured such that the strength of the coupling to the drive means is variable upon movement between the first and second positions.

18. The conveying apparatus as claimed in claim 17 wherein the coupling means of the drive means comprises a plurality of magnets arranged along the second guide rail, and wherein the coupling part of each conveying device comprises a ferromagnetic material.

19. The conveying apparatus as claimed in claim 18, wherein the coupling means of the drive means further comprises a plurality of individual members mounted for guidance along the second guide rail, with at least some of the individual members including ferromagnetic flux parts for transmitting the magnetic force to the coupling part of each conveying device.

20. The conveying apparatus as claimed in claim 19, wherein at least some of the individual members include two flux parts which are located opposite one another and, in the region of the magnets and of the first guide rail, are aligned essentially perpendicularly to the magnets and/or to the conveying devices, the spacing between the flux parts in the region of the first guide rail being smaller than the spacing in the region of the magnets.

21. The conveying apparatus as claimed in claim 17, wherein at least one switchable restraining element is arranged in the region of the first guide rail, and is capable of stopping a conveying device.

22. The conveying apparatus as claimed in claim 21, wherein the one restraining element acts on the coupling part or on the guide part or on the carrying part.

23. The conveying apparatus as claimed in claim 18 wherein the strength of the magnets acting on the coupling part is stronger in the first position than in the second position, and further comprising at least one switchable restraining element positioned to selectively engage the coupling part of each conveying device and move the coupling part from the first position to the second position and stop the associated conveying device.

* * * * *

UNITED STATES PATENT AND TRADEMARK OFFICE
CERTIFICATE OF CORRECTION

PATENT NO. : 6,742,648 B2
DATED : June 1, 2004
INVENTOR(S) : Honegger

It is certified that error appears in the above-identified patent and that said Letters Patent is hereby corrected as shown below:

Title page,
Item [56], References Cited, U.S. PATENT DOCUMENTS, insert the following:

-- 5,222,587    6/1993    Chevalier et al. --.

Signed and Sealed this

Twenty-fourth Day of August, 2004

JON W. DUDAS
*Director of the United States Patent and Trademark Office*